US011308240B2

(12) United States Patent
Zeh et al.

(10) Patent No.: US 11,308,240 B2
(45) Date of Patent: Apr. 19, 2022

(54) CRYPTOGRAPHIC CIRCUIT AND DATA PROCESSING

(71) Applicant: Infineon Technologies AG, Neubiberg (DE)

(72) Inventors: Alexander Zeh, Munich (DE); Viola Rieger, Munich (DE); Klaus Scheibert, Grasbrunn (DE)

(73) Assignee: Infineon Technologies AG, Neubiberg (DE)

( * ) Notice: Subject to any disclaimer, the term of this patent is extended or adjusted under 35 U.S.C. 154(b) by 245 days.

(21) Appl. No.: 16/051,775

(22) Filed: Aug. 1, 2018

(65) Prior Publication Data

US 2019/0050601 A1 Feb. 14, 2019

(30) Foreign Application Priority Data

Aug. 9, 2017 (DE) .......................... 102017118164.4

(51) Int. Cl.
*G06F 21/72* (2013.01)
*H04L 9/08* (2006.01)
*G06F 21/60* (2013.01)
*G09C 1/00* (2006.01)
*G06F 7/58* (2006.01)

(52) U.S. Cl.
CPC .............. *G06F 21/72* (2013.01); *G06F 7/588* (2013.01); *G06F 21/602* (2013.01); *G09C 1/00* (2013.01); *H04L 9/083* (2013.01); *H04L 9/0822* (2013.01); *H04L 9/0841* (2013.01); *H04L 9/0861* (2013.01); *H04L 9/0877* (2013.01); *H04L 2209/84* (2013.01)

(58) Field of Classification Search
CPC ........ G06F 21/72; G06F 21/602; G06F 7/588; G06F 7/544; H04L 9/0841; H04L 9/0861; H04L 9/0822; H04L 9/083; H04L 9/0877; H04L 2209/84; H04L 9/14; G09C 1/00; G06K 19/06187
See application file for complete search history.

(56) References Cited

U.S. PATENT DOCUMENTS 4,357,558 A * 11/1982 Massoni ............... B60Q 1/1423
315/153
10,089,447 B2 * 10/2018 Pandey ............... G06F 12/0811
2003/0212897 A1 * 11/2003 Dickerson ............... G06F 21/79
726/34

(Continued)

FOREIGN PATENT DOCUMENTS

DE 102009027676 A1 1/2011

*Primary Examiner* — Abu S Sholeman
(74) *Attorney, Agent, or Firm* — Eschweiler & Potashnik, LLC

(57) ABSTRACT

A method for cryptographic data processing by means of a circuit comprises using a first circuit section to perform a first cryptographic operation in order to obtain first cryptographic data. The method further includes transmitting the first cryptographic data to a second circuit section via a transmission area of the circuit that physically separates the second circuit section from the first circuit section and whose resistance to attacks is at most as high as the resistance of the first circuit section. The method includes using the second circuit section to perform a second cryptographic operation using the first cryptographic data in order to obtain second cryptographic data.

25 Claims, 2 Drawing Sheets

(56) References Cited

U.S. PATENT DOCUMENTS

| | | | | |
|---|---|---|---|---|
| 2010/0017879 A1* | 1/2010 | Kuegler | ............... | G06F 21/14 |
| | | | | 726/23 |
| 2010/0272256 A1* | 10/2010 | Baras | ................... | H04L 9/088 |
| | | | | 380/46 |
| 2011/0261953 A1* | 10/2011 | Guilley | ................ | H04L 9/003 |
| | | | | 380/2 |
| 2012/0129493 A1* | 5/2012 | Vasudevan | ........... | H04L 9/3271 |
| | | | | 455/411 |
| 2012/0257746 A1* | 10/2012 | Brown | ................ | H04L 63/061 |
| | | | | 380/44 |
| 2013/0232345 A1* | 9/2013 | Johnson | ................ | G06F 21/71 |
| | | | | 713/193 |
| 2014/0007087 A1* | 1/2014 | Scott-Nash | ........... | G06F 21/53 |
| | | | | 718/1 |
| 2014/0010371 A1* | 1/2014 | Khazan | ............... | H04L 9/0894 |
| | | | | 380/278 |
| 2014/0281573 A1* | 9/2014 | Jaffe | ...................... | G06F 7/723 |
| | | | | 713/189 |
| 2015/0074159 A1* | 3/2015 | Poschmann | ............ | G09C 1/00 |
| | | | | 708/270 |
| 2015/0074433 A1* | 3/2015 | Zhu | ................... | G11C 11/1695 |
| | | | | 713/300 |
| 2015/0324583 A1 | 11/2015 | Emele | | |
| 2016/0036587 A1* | 2/2016 | Hans | ..................... | G06F 21/77 |
| | | | | 713/193 |
| 2016/0099922 A1* | 4/2016 | Dover | .................. | G06F 21/575 |
| | | | | 713/171 |
| 2016/0259584 A1 | 9/2016 | Schlottmann | | |
| 2017/0098102 A1* | 4/2017 | Coker | ................. | G06F 21/602 |
| 2017/0098147 A1* | 4/2017 | Shila | .................. | G06Q 20/347 |
| 2021/0103674 A1* | 4/2021 | Kuan | .................. | G06F 21/602 |

\* cited by examiner

CRYPTOGRAPHIC CIRCUIT AND DATA PROCESSING

REFERENCE TO RELATED APPLICATIONS

This application claims priority to DE 10 2017 118 164.4 filed on Aug. 9, 2017, the contents of which are incorporated by reference in their entirety.

FIELD

The present disclosure relates to cryptographic circuits and methods for cryptographic data processing using a cryptographic circuit.

BACKGROUND

Cryptography ensures confidentiality, authenticity and data integrity. Cryptography will become increasingly important in the automotive sector for what are known as electronic control units (ECU), which form nodes of a network situated in the automobile, while edges are communication networks such as CAN, CAN-FD and Ethernet. Electronic control units are configured as a microcontroller unit.

A hardware security module (HSM) forms a trust anchor inside the microcontroller unit. The hardware security module is protected by various hardware mechanisms and contains particular hardware accelerators in order to undertake hash functions and in order to undertake symmetric and asymmetric cryptography functions. The hardware security module often also contains a specially secured key memory.

The hardware security module is the only place inside the microcontroller unit at which cryptographic operations are performed with the assistance of predetermined hardware accelerators. It is assumed that the hardware security module, as a trust anchor, forms a secure performance environment.

A transmission of cryptographically secured data from a peripheral device to the hardware security module causes a relatively long delay, costs processor power and contributes to additional power consumption.

SUMMARY

The text below presents a simplified summary in order to provide a basic understanding of the disclosure in one or more respects. This summary gives a coarse overview of the disclosure and is intended neither to identify substantial or critical features of the disclosure nor to derive the scope of the disclosure. Rather, the summary is primarily intended to depict some concepts of the disclosure in a simple manner in advance of the more detailed description that follows below.

In one respect, the disclosure comprises a method for cryptographic data processing using a circuit. The method comprises using a first circuit section to perform a first cryptographic operation in order to obtain first cryptographic data. The method comprises transmitting the first cryptographic data to a second circuit section via a transmission area of the circuit. The transmission area physically separates the second circuit section from the first circuit section. A resistance of the transmission area to attacks is at most as high as the resistance of the first circuit section. The method further comprises using the second circuit section to perform a second cryptographic operation using the first cryptographic data in order to obtain second cryptographic data.

In one respect, the disclosure comprises a cryptographic circuit that is configured for cryptographic data processing. The cryptographic circuit comprises a secure area secured against attacks. In this case, a first circuit section of the cryptographic circuit is arranged inside the secure area. A second circuit section of the cryptographic circuit is arranged outside the secure area.

This summary is put first with the understanding that it must not be used to interpret the claims or to restrict the scope of the claims. The text below also discloses other methods and apparatuses. Those from the field will identify additional features and advantages when the detailed description below is read and the drawings are considered.

BRIEF DESCRIPTION OF THE DRAWINGS

The accompanying drawings are part of the present disclosure in order to allow further understanding of the present disclosure. The drawings depict embodiments of the present disclosure and are used together with the description to explain basic concepts of the disclosure. The claimed subject matter is described below with reference to the accompanying drawings. Views of the example embodiments serve merely to depict selected features of the respective example embodiment.

DETAILED DESCRIPTION

Figure 1:
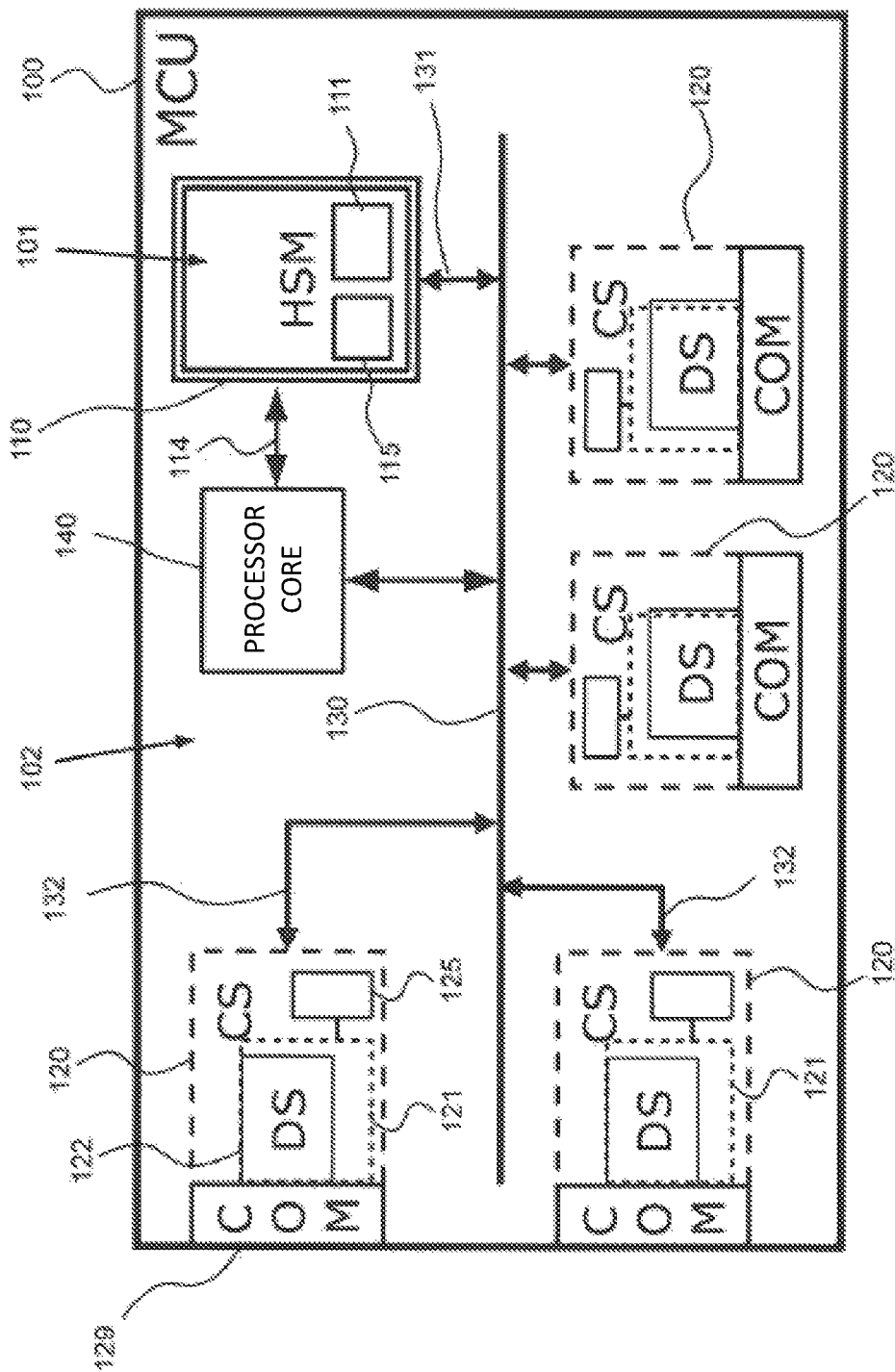
FIG. 1 shows a block diagram depicting an apparatus according to some embodiments by way of example.

For the purposes of explanation, a number of specific details are explained in order to provide a deep understanding of the claimed subject matter. However, it should be clear that the claimed subject matter can be implemented without these specific details.

The detailed description that follows refers to the accompanying drawings, which, as an illustration, show specific details and embodiments with which the disclosure can be implemented. These embodiments are described in sufficient depth of detail to allow a person skilled in the art to implement the disclosure. Other embodiments can be used. In this case, structural, logical and electrical amendments can be made without departing from the disclosure. The various embodiments are not necessarily mutually exclusive, since some embodiments can be combined with other embodiments in order to produce further embodiments. Various embodiments are described herein in conjunction with apparatuses; various embodiments are described herein in conjunction with methods. It should be understood in this case that embodiments described in conjunction with methods may similarly also be implemented as an apparatus, and vice versa.

In general, a cryptographic circuit is configured for cryptographic data processing. In some embodiments, the cryptographic circuit is configured to be in a module. By way of example, the cryptographic circuit is configured as part of a microcontroller module, which is referred to below as a microcontroller unit (MCU) 100.

The microcontroller unit 100 comprises a secure area 101, secured against attacks. In some embodiments, the secure area is configured to be resistant to a differential power analysis. By way of example, secure area 101 is configured to randomize power consumption in the secure area. At least one effect may be that a differential power analysis is hampered because an observed power consumption allows at best a statistically poorly demonstrable inference about a performed cryptographic operation.

A first circuit section 111 of the cryptographic circuit of the microcontroller unit 100 is arranged inside the secure area 101. A second circuit section 121 of the cryptographic circuit of the microcontroller unit 100 is arranged in an unsecured area 102 outside the secure area 101. In this context, the wording "unsecured" means that an attack in the unsecured area 102 has a higher prospect of success than an attack in the secure area 101.

In some embodiments, the first circuit section 111 in the secure area 101 forms what is known as a trust anchor (Root of Trust), the data of which, provided that the origin from the trust anchor is authenticated, do not need to be subjected to verification by another component of the microcontroller unit 100.

In general, in some embodiments, the cryptographic circuit of the microcontroller unit 100 is configured such that that circuit section from the first circuit section 111, whose resistance to attaches is higher, controls the second circuit section 121, whose resistance to attacks is lower. Accordingly, in some embodiments, the cryptographic circuit of the microcontroller unit 100 is configured so that the first circuit section 111 in the secure area 101 controls the second circuit section 121 of the photographic circuit outside the secure area 101. By way of example, control may be provided such that the first circuit section 111 is configured to activate or deactivate the second circuit section 121. In one embodiment, the first circuit section 111 may be configured so as, in the event of deactivation of the second circuit section 121, to selectively perform operations that are described below in regard to the second circuit section 121.

In some embodiments, the second circuit section 121 is physically separate from the first circuit section. With respect to a transmission of data between the first circuit section 111 and the second circuit section 121, the physical separation means that the transmission takes place via a transmission area of the cryptographic circuit whose resistance to attacks is at most as high as the resistance of the first circuit section 111 in the secure area 101. In some embodiments, the resistance of the transmission area is lower than the resistance of the first circuit section 111; in some embodiments, the resistance of the transmission area is also lower than the resistance of the second circuit section 121.

In some embodiments, the cryptographic circuit of the microcontroller unit 100 in an area 102 outside the secure area 101 having the first circuit section 111 comprises multiple second circuit sections 121. The multiple second circuit sections 121 are, in some embodiments, separated from one another by unsecured areas whose resistance to attacks is lower than the strength of the area having the first circuit section and is lower than the resistance of the area having the second circuit sections. Each of the multiple second circuit sections 121 may be coupled to the first circuit section 111 via an unsecured connection 130, 131, 132. In some embodiments, the resistance of the unsecured connection 130, 131, 132 to attacks is lower than the resistance of the first circuit section 111 in the secure area 101. As such, the microcontroller unit 100 can have at least two mutually separate circuit elements connected to one another by the unsecured connection. The microcontroller unit 100 can contain for example, multiple components arranged on a support, for example, such as a printed circuit board (PCB), for example. In some embodiments, the multiple components are integrated as a system on chip.

In general, a first component can have a processor chip having the first circuit section 111. By way of example, the die of the processor chip has a processor core 140 arranged in the area 102 outside the secure area 101, and also the first circuit section 111 itself arranged in the secure area 101. In some embodiments, the first circuit section 111 and the second circuit section 121 are integrated on one die. Accordingly, in the example embodiment shown in FIG. 1, the microcontroller unit 100 comprises at least one hardware security module (HSM) 110. In some embodiments, the die has a coprocessor that is coupled to the processor core 140 and in which the first circuit section 111 is integrated with the cryptographic circuit of the hardware security module 110. In another embodiment, the hardware security module 110 and the processor 140 are arranged in separate components that, for example for the purpose of short latencies, may be coupled to one another directly by a coprocessor bus 114. In some embodiments, the coprocessor extends beyond the boundaries of the secure area 101. In some embodiments, the coprocessor is configured to generate a random number and/or a pseudo random number.

In one embodiment of the cryptographic circuit of the microcontroller unit 100, the first circuit section 111 and the second circuit section 121 are configured for key agreement according to a protocol using an asymmetric key. In one embodiment of the cryptographic circuit, the first circuit section 111 and the second circuit section 121 are configured for key transportation according to a protocol using a secret key.

In the example embodiment shown in FIG. 1, the microcontroller unit 100 comprises one or more peripheral circuit sections 120, which are each also referred to herein as a crypto satellite (CS). By way of example, the crypto satellite has the second circuit element. In some embodiments, the crypto satellite having the second circuit section 121 is able to be selectively put into an idle state and/or shut down completely. At least one effect may be that a power draw by the second circuit section 121 is reduced or avoided.

In some embodiments, the cryptographic circuit of the microcontroller unit 100 is configured so that the second circuit section 121 cryptographically processes other data. By way of example the second circuit section of the one or more peripheral circuit sections 120, in some embodiments, comprises in each case a crypto circuit 122 that is configured for cryptographic processing of data. The crypto circuit 122 may, in some embodiments, be useable in regard to authentication, for example; be it that the crypto circuit 122 produces a signature for a message to be transmitted by the peripheral circuit section 120, or be it that the crypto circuit 122 verifies a signature for a message received by the peripheral circuit section 120.

In some embodiments, the crypto circuit 122 is configured such that data reaching the crypto circuit can no longer leave the crypto circuit 122 as plain text after the cryptographic processing or, in another embodiment, can no longer leave at all. By way of example, the crypto circuit 122 may be configured to perform a hash operation on data reaching the crypto circuit 122, after which admittedly the hash for the data but not the data themselves is preserved and therefore also can no longer leave the crypto circuit 122. In some embodiments, the crypto circuit 122 may also be configured as a source of data. By way of example, the crypto circuit 122 can decrypt incoming data that are encrypted in order to obtain plain text. The second circuit section 121 is, in some embodiments, configured to output the plain text for further processing on the microcontroller unit 100, for example to the processor 140. In some embodiments, the second circuit section 121 in the crypto satellite is configured wholly or in part as a state machine. In one embodiment, the crypto circuit 122 may be configured as a state machine. At least one effect may be low surface area use on a die having the second circuit section 121. At least one effect may be that the state machine achieves a high processing speed and/or a high level or reliability.

In some embodiments, the cryptographic circuit of the microcontroller unit 100 in the area 102 outside the secure area 101 has an interface 129 for transmitting and/or receiving other data. The peripheral circuit sections 120 contain, in some embodiments, a communication interface (COM) as the interface 129. The communication interface is, in some embodiments, configured to interchange data with a data bus, such as a controller area network bus (CAN bus), for example, and/or with other peripheral devices, such as a sensor, for example.

In some embodiments, the second circuit section 121 at the interface 129 is configured to sign data from the first circuit section 111 in order to authenticate the data with respect to their origin from the cryptographic circuit 100.

In some embodiments, the second circuit section 121 at the interface 129 is configured to verify a signature for other data received at the interface from a third party (not shown) in order to authenticate the other data for their origin from the third party.

In some embodiments, the second circuit section 121 at the interface 129 is configured to sign other data from the third party in order to authenticate the other data with respect to their origin from the interface 129.

In some embodiments, the first circuit section 111 in the hardware security module (HSM) 110 and the second circuit section 121 in the peripheral circuit section(s) 120 are coupled to one another via an unsecured connection. The microcontroller unit 100 can comprise a bus 130, for example, to which the hardware security module 110 is communicatively coupled using a coupling connection 131 and/or the one or more peripheral circuit section(s) 120 is/are commutatively coupled using a coupling connection 132. The bus 130 and/or the coupling connection 131, 132 may be implemented as conductor tracks, optical fibers, wirelessly or as another signal transmission medium. In some embodiments, the hardware security module 110 and/or the one or more peripheral circuit section(s) 120 is/are configured to communicate commands and/or data via the bus 130.

At least one section of the bus 130 is arranged outside the secure area 101 of the microcontroller unit 100. A strength or resistance of the bus 130 towards attacks such as side channel attacks, for example, is thus lower than the strength of the hardware security module 110, insofar as it is arranged in the secure area 101. Therefore, the resistance of the bus 130 to attacks is lower than the resistance to the first circuit section 111 in the secure area 101. In some embodiments, the resistance of the bus 130 to attacks is also lower than the resistance of the crypto circuit 122 of the second circuit section 121.

The microcontroller unit 100 can contain other components, for example main memory (not depicted), that are commutatively coupled to the bus 130, for example, but which are not discussed further here.

In some embodiments, the cryptographic circuit of the microcontroller unit 100 is configured for use of a shared key, which, depending on the context, is also referred to below as a main key K or as a long term third-party key, and, in some embodiments, as a derived main key K' or as a short term third-party key.

In one embodiment of the cryptographic circuit of the microcontroller unit 100, the cryptographic circuit is configured to use a shared key as a long term key in order to encrypt a short term key. In some embodiments, the first circuit section 111 has a first memory 115, for example, that is configured to store the shared key, also called long term third-party key or main key K herein, inside the secure area 101 so as to be secure against attacks in order to be able to use it in the long term.

In some embodiments of the cryptographic circuit, the second circuit section 121 comprises a memory 125. In one embodiment, the second circuit section 121 is coupled to the second memory 125. The second memory 125 is, in some embodiments, configured to store the shared key outside the secure area 101. The shared key is, in some embodiments, the short term third-party key or the derived main key K', for example. Some embodiments of the cryptographic circuit 100 are configured to use the shared key both—in a first cryptographic operation—in the first circuit section 111 and—in a second cryptographic operation—in the second circuit section 121.

The memory 125, which is associated with the second circuit section 121, may, in one embodiment, permanently store multiple short term keys ks intended for future use. The second circuit section 121 is, in some embodiments, configured to select one of the multiple short term keys ks in order to perform the second cryptographic operation using the selected short term key ks.

Figure 2:
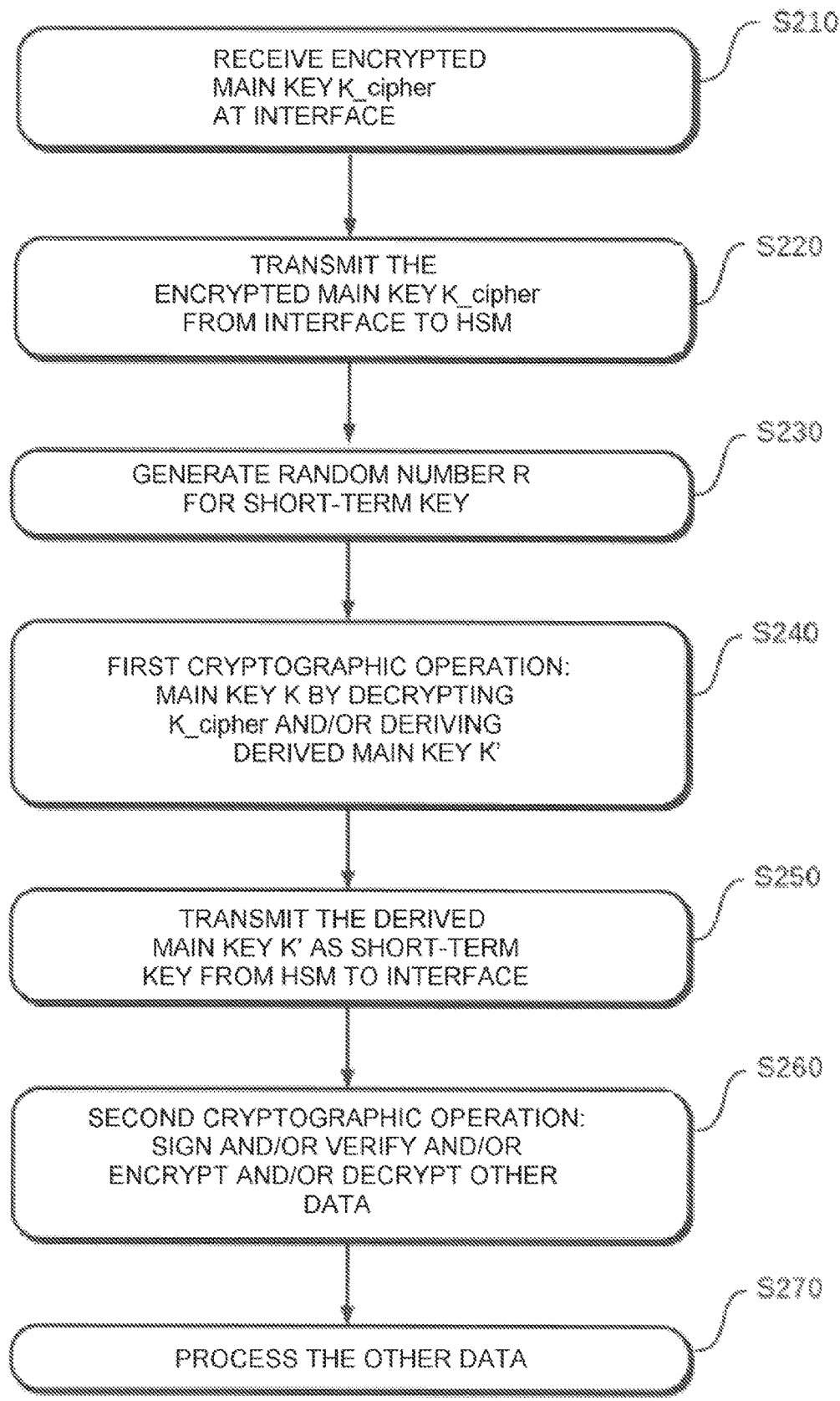
FIG. 2 shows a flowchart depicting a method according to some embodiments by way of example.

The text below uses an example embodiment to describe use of the cryptographic circuit according to some embodiments. In so doing, reference is made to FIG. 1 and FIG. 2. FIG. 2 shows a flowchart depicting methods for cryptographic data processing in example applications using the cryptographic circuit of the microcontroller unit 100 according to some embodiments.

At S210, the microcontroller unit 100 uses the interface 129 to receive other data from a third party. By way of example, the other data are an encrypted main key K_cipher that the third party and the microcontroller unit 100 agree in the long term as a shared key for future shared use.

In some embodiments, the method comprises—instead of transportation of the encrypted main key K_cipher provided for use as a long term third-party key from the third party to the microcontroller unit 100—agreement about the long term third-party key using a method for agreeing a shared key with the third party, such as a Diffie-Hellman method, for example. In one embodiment, the encrypted main key K_cipher is accordingly encrypted with a public key P of the microcontroller unit 100. The microcontroller unit 100 uses the secure area 101, for example the first memory 115 of the hardware security module 110, to store a secret key S associated with the microcontroller unit 100 or with the public key P of the microcontroller unit 100.

At S220, the encrypted main key K_cipher is transmitted via the bus 130 from the interface 129 to the hardware security module (HSM) 110 in the secure area 101 of the microcontroller unit 100.

At S230, the hardware security module 110, in some embodiments geared to a particularly high level of security for the application against attacks, generates a random number R. As used herein, the term "random number" covers both genuine random numbers and pseudo random numbers. The hardware security module 110 can use the random number as a short term key in the short term.

At S240, the hardware security module (HSM) 110 performs a first cryptographic operation on the encrypted main key K_cipher in order to obtain first cryptographic data.

In some embodiments, the hardware security module (HSM) 110 decrypts the encrypted main key K_cipher using the random number R as a secret key and thus obtains the main key K as a long term key that is configured or useable for encrypting and/or decrypting data. Thereafter, the decrypted main key K, in some embodiments, forms the first cryptographic data.

In some embodiments, the first cryptographic operation comprises encrypting the short term key using the long term key. By way of example, the first cryptographic operation generates the short term third-party key using the long term third-party key. In particular, the first circuit section 121 can, in some embodiments, encrypt the random number R using the main key K. In this case, the main key K forms the long term key, while the random number R forms the short term key.

In some embodiments of the method, the hardware security module 110 uses the main key K and the random number R to generate a derived main key K' as first cryptographic data. The derived main key K' may be intended for use as a short term third-party key, for example. In particular, the second circuit section 121 of the microcontroller unit 100 can use the derived main key K' as the short term third-party key. Accordingly, the cryptographic circuit of the microcontroller unit 100 uses the derived main key K', in some embodiments, for one or more uses from a group of uses comprising: signing, authenticating, hashing, encrypting, decrypting data.

In general, the method comprises transmitting the short term third-party key from the first circuit section to the second circuit section. At S250, the first cryptographic data, i.e. the derived main key K' in the example described at present, is accordingly transmitted from the first circuit section 111 in the secure area 101 to the second circuit section 121 in the less secure area 102. The second circuit section 121 is physically separate from the first circuit section 111, so that the derived main key K' is transmitted by a transmission link or a transmission area connecting the second circuit section 121 to the first circuit section 111. In the example explained at present, as depicted by way of example in FIG. 1, this means that the derived main key K' is transmitted from the hardware security module 110 to the crypto satellite 120. The transmission is effected via the bus 130 of the microcontroller unit 100, for example, with the bus 130, as the transmission medium, forming the transmission area of the cryptographic circuit of the microcontroller unit 100 that physically separates the second circuit section 121 from the first circuit section 111.

In general, the first cryptographic data can be transmitted in unencrypted fashion. In the example explained at present, for example, the derived main key K' can be transmitted from the first circuit section 111 to the second circuit section 121 via the bus 130 in unencrypted fashion.

At least one effect of the described transmission of the first cryptographic data, that is to say for example the derived main key K', by the less secure transmission area may be that a ratio of complexity for securing circuit sections such as the first circuit section 111 and the second circuit section 121 for example, the benefit of a transmission that probably proceeds without attack-related disruption or compromising of the transmitted data, for example, is particularly high. The reason is that the complexity for securing a small chip surface area, as is needed for a part of the coprocessor that is protected in the secure area 101, for example, and/or as is required for the crypto circuit 122, may be much lower than the complexity that would be required for comparable protection of the entire microcontroller unit 100. A loss of protection on account of the transmission by the less secure transmission area does not justify the higher complexity if the probability of a transmission that takes place only rarely being used by an attacker to compromise the transmitted data is low. This is especially so if the compromise relates to the derived key K', because this key can be generated by performing the first cryptographic operation again.

At S260, the second circuit section 121 is used to a perform a second cryptographic operation using the first cryptographic data in order to obtain second cryptographic data. In some embodiments, the first circuit section 111 controls the operation of the second circuit section 122. By way of example, the first circuit section 111 causes the second circuit section 121 to perform the second cryptographic operation. In some embodiments, the first circuit section 111 controls the cycle of the second cryptographic operation in the second circuit section 121. The text below briefly describes some example applications without the description with respect to possible applications being intended to be regarded as final. Rather, a person skilled in the art can imagine other applications.

By way of example, the crypto circuit 122 of the second circuit section 121 uses the first cryptographic data, which are the derived main key K' in the example described, for example, to decrypt other data received at the interface 129, for example from the third party.

In one embodiment, the crypto circuit 122 of the second circuit section 121 authenticates other data that have been received at the interface 129. The second circuit section then uses the bus 130, 131, 132, for example, to transmit the other data with the signature to the hardware security module 110. At least one effect may be that the first circuit section 111 in the secure area 101 can verify the authenticity of the data with respect to their reception at the interface 129 on the basis of the signature by virtue of the first circuit section 111 verifying the genuineness of the signature and the validity of the signature.

In some embodiments, the short term third-party key is intended or adapted to be applied to the other data that the second circuit section interchanges with the third party.

As such, the second circuit section 121 can use the short term third-party key to generate a signature for the other data, for example. Accordingly, the crypto circuit 122 of the second circuit section 121 uses the derived main key K' in an embodiment in order to generate a signature for other data. The microcontroller unit 100 transmits the other data with the signature of the third party, for example, by means of the interface 129 in order to authenticate the other data with respect to their origin from the microcontroller unit 100. At least one effect may be that the third party is able to verify the authenticity of the data on the basis of the signature by virtue of the third party verifying the genuineness of the signature and the validity of the signature.

In one embodiment, the crypto circuit 122 of the second circuit section 121 verifies a signature for other data that have been received by the second circuit section 121 at the interface 129 of the crypto satellite 120 with respect to the authenticity of the other data, after which the other data are signed by the third party in the event of authenticity. By way of example, the signature for the other data can be checked using the short term third-party key, i.e. using the derived main key K' in the example described above.

At S270, the other data are processed. By way of example, the third party processes the other data after the third party has used the checked signature to verify that the other data are actually transmitted from the microcontroller unit 100 to the third party. In another example, the first circuit section 111 processes the other data after the first circuit section 111 has used the checked signature to verify that the other data are actually transmitted from the interface 129 to the first circuit section 111.

At least one effect of the method in the variants or embodiments described above is that the secure area 101 has low surface area use because the secure area 101 does not have to be configured for maximum utilization with respect to the cryptographic operations that are to be performed by the microcontroller unit 100 during operation. The reason is that the crypto satellite(s) can likewise perform cryptographic operations at the interfaces. In particular, the crypto satellite(s) can perform elementary cryptographic operations, such as generation of a signature or verification of a signature, for example, particularly efficiently if the second circuit section in the crypto satellite comprises a state machine.

The text below describes further variants of the method described above according to other embodiments.

In some embodiments, the first cryptographic data are transmitted in encrypted fashion. In some embodiments, the transmission is based on a protocol using secret keys. By way of example, the transmission of the first cryptographic data, such as the main key K, the derived main key K' or other data, for example, from the processor 140 of the microcontroller unit 100 of the first circuit section 111 to the second circuit section 121 can be performed on the basis of a protocol using an asymmetric key. Therefore, in some embodiments, the method comprises, in the first circuit section 111, generating a public key P1 for the first circuit section 111. In this case, the first cryptographic data comprise the first public key P1 for the first circuit section 111. The method further comprises, in the second circuit section 121, generating a shared key K12 using the public key P1 for the first circuit section 111. In this case, the second cryptographic data comprise the shared key K12. In one embodiment, the first public key P1 is transmitted from the communication interface 129 to a third party, which can use the first public key P1 to encrypt a message M to the microcontroller unit 100. By way of example, the message M from the third party contains the main key K. In some embodiments, the method comprises, in the second circuit section 121, generating a public key P2 for the second circuit section 121. In this case, the second cryptographic data comprise the second public key P2 for the second circuit section 121. In some embodiments, the method comprises, in the first circuit section 111, generating the shared key P12 using the public key P2 for the second circuit section 121. In this case, the first cryptographic data comprise the shared key P12.

As used herein, the words "by way of example" and the wording "for example" mean that an example is given or an embodiment is depicted. As aspect cited by way of example does not necessarily have to be interpreted as advantageous or preferable. Rather, the example is used to explain a concept or a technique on the basis of a specific possible embodiment. The term "technique" in this case covers any product of planned action using forces of nature, in particular "equipment" "apparatus", "device", "system", "manufactured product", "computer-readable medium", "computer program product" and "method", depending on the context.

The invention claimed is:

1. A method for cryptographic data processing using a circuit, comprising:
    using a first circuit section of the circuit to perform a first cryptographic operation on data in order to obtain first cryptographic data, wherein the first circuit section is arranged in a secure area associated with a first resistance to attacks;
    transmitting the first cryptographic data to a second circuit section of the circuit through a transmission area of the circuit that physically separates the second circuit section from the first circuit section, and wherein the transmission area is in a less secure area with a second resistance to attacks that is less than the first resistance to attacks associated with the first circuit section; and
    using the second circuit section to perform a second cryptographic operation using the first cryptographic data in order to obtain second cryptographic data;
    wherein the first cryptographic operation is performed using a long term key that is configured to encrypt and/or decrypt the data.

2. The method as claimed in claim 1, wherein the second cryptographic operation is also performed using a long term key that is configured to encrypt and/or decrypt data.

3. The method as claimed in claim 1,
    wherein the data comprises a short term key, and
    wherein the first cryptographic operation comprises encrypting the short term key using the long term key.

4. The method as claimed in claim 1, wherein that circuit section from the first circuit section and the second circuit section whose resistance to attacks is higher controls that circuit section whose resistance to attacks is lower.

5. The method as claimed in claim 1, wherein the first cryptographic data comprise a short term key generated using the first cryptographic operation.

6. The method as claimed in claim 1, wherein the first cryptographic data are transmitted in unencrypted fashion.

7. The method as claimed in claim 1, comprising:
    in the first circuit section, generating a public key for the first circuit section, wherein the first cryptographic data comprise the public key for the first circuit section; and
    in the second circuit section, generating a shared key using the public key for the first circuit section, wherein the second cryptographic data comprise the shared key; and then:
    in the second circuit section, generating a public key for the second circuit section, wherein the second cryptographic data comprise the public key for the second circuit section; and
    in the first circuit section, generating a second shared key using the public key for the second circuit section, wherein the first cryptographic data comprise the second shared key.

8. The method as claimed in claim 1, wherein the second cryptographic data comprise a signature for other data, the method further comprising:
    generating the signature of the other data; and
    transmitting the other data with the signature from the second circuit section to the first circuit section and/or to an interface that is configured for communication with a third party.

9. The method as claimed in claim 8, the method further comprising:
    checking the signature in the first circuit section; and
    processing the other data.

10. A method for cryptographic data processing using a circuit, comprising:
    using a first circuit section of the circuit to perform a first cryptographic operation on data in order to obtain first cryptographic data, wherein the first circuit section is arranged in a secure area associated with a first resistance to attacks;
    transmitting the first cryptographic data to a second circuit section through a transmission area of the circuit that physically separates the second circuit section from the first circuit section, and wherein the second circuit section is in a less secure area with a second resistance to attacks that the first resistance to attacks associated with the first circuit section, and using the second circuit section of the circuit to perform a second cryptographic operation using the first cryptographic data in order to obtain second cryptographic data, wherein the second cryptographic data comprise a signature for other data, the method further comprising:
generating the signature of the other data; and
transmitting the other data with the signature from the second circuit section to the first circuit section and/or to an interface that is configured for communication with a third party;
in the first circuit section, generating a short term third-party key using a shared key,
wherein the first cryptographic data contain the short term third-party key; and
wherein the short term third-party key is adapted to be applied to the other data that the second circuit section interchanges with the third party.

11. The method as claimed in claim 10, wherein the signature is checked using the short term third-party key.

12. The method as claimed in claim 10, further comprising:
in the second circuit section, using the short term third-party key for generating the signature for the other data.

13. The method as claimed in claim 11, the method further comprising:
in the second circuit section, receiving the other data from the third party; and
generating the signature for the other data using the short term third-party key.

14. The method as claimed in claim 11, further comprising:
generating a long term third-party key using a method for agreeing a shared key with the third party;
generating the short term third-party key using the long term third-party key; and
transmitting the short term third-party key from the first circuit section to the second circuit section.

15. A cryptographic circuit configured for cryptographic data processing, comprising:
a first circuit section of the cryptographic circuit arranged inside a secure area secured against attacks and configured to use a long term key to encrypt or decrypt data to obtain first cryptographic data, and
a second circuit section of the cryptographic circuit arranged outside the secure area and configured to perform a second cryptographic operation using the first cryptographic data in order to obtain second cryptographic data;
wherein the cryptographic circuit is configured for use of a shared key in the first circuit section and in the second circuit section.

16. The cryptographic circuit as claimed in claim 15, wherein the cryptographic circuit is configured so that the first circuit section in the secure area controls the second circuit section of the cryptographic circuit outside the secure area.

17. The cryptographic circuit as claimed in claim 15, wherein the first circuit section has a first memory in which the shared key is securely stored and the second circuit section is coupled to a second memory in which the shared key is securely stored.

18. The cryptographic circuit as claimed in claim 16, wherein the first circuit section and the second circuit section are coupled to one another through an unsecured connection in a transmission area whose resistance to attacks is lower than a first resistance of the first circuit section in the secure area.

19. The cryptographic circuit as claimed in claim 15, wherein the cryptographic circuit outside the secure area has an interface for transmitting and/or receiving other data and is configured so that the second circuit section cryptographically processes the other data.

20. The cryptographic circuit as claimed in claim 19, wherein the second circuit section at the interface is configured to:
sign data from the first circuit section in order to authenticate the data with respect to their origin from the cryptographic circuit; and/or
verify a signature for other data received at the interface from a third party in order to authenticate the other data with respect to their origin from the third party;
and/or sign other data from the third party in order to authenticate the other data with respect to their origin from the interface.

21. The cryptographic circuit as claimed in claim 15, wherein the cryptographic circuit is configured to be in a module that has at least two mutually separate circuit elements connected to one another by an unsecured connection.

22. The cryptographic circuit as claimed in claim 21, wherein the first circuit section has a processor and the second circuit section has a state machine.

23. The cryptographic circuit as claimed in claim 15, further comprising:
a die having the secure area and having a processor core outside the secure area,
wherein the die has a coprocessor that is coupled to the processor core and in which the cryptographic circuit is integrated, and
wherein the coprocessor extends beyond boundaries of the secure area.

24. The cryptographic circuit as claimed in claim 15, wherein the secure area is configured to be resistant to a differential power analysis.

25. The cryptographic circuit as claimed in claim 24, wherein the secure area is configured to randomize power consumption.

* * * * *